Sept. 14, 1965 RYO IGARASHI 3,206,730

TUNNEL DIODE MEMORY DEVICE

Filed June 11, 1962 2 Sheets-Sheet 1

INVENTOR.
RYO IGARASHI

BY

OSTROLENK, FABER, GERB and SOFFEN
ATTORNEYS

Sept. 14, 1965 RYO IGARASHI 3,206,730

TUNNEL DIODE MEMORY DEVICE

Filed June 11, 1962 2 Sheets-Sheet 2

INVENTOR.
RYO IGARASHI

BY

OSTROLENK, FABER, GERB and SOFFEN
ATTORNEYS

United States Patent Office 3,206,730
Patented Sept. 14, 1965

3,206,730
TUNNEL DIODE MEMORY DEVICE

Ryo Igarashi, Tokyo, Japan, assignor to Nippon Electric Company Limited, Tokyo, Japan Filed June 11, 1962, Ser. No. 201,348
Claims priority, application Japan, June 13, 1961, 36/21,068
6 Claims. (Cl. 340—173)

This invention relates to information memory devices and more particularly to memory devices utilizing the two stable states of a tunnel diode for use as memory devices in binary information systems, such as that employed in electronic computers.

Prior art memory devices employing tunnel diode devices have been found to become extremely unwieldy due to the complex control signals employed in memory switching operations and further due to the instability of the memory devices themselves.

The instant invention provides a tunnel diode memory assembly having a substantially simplified circuit construction to produce a memory device of low cost which is capable of operating at extremely high speeds by means of providing simplified control signals employed in the reading and writing operations of the memory system.

The instant invention is comprised of an ordered matrix made up of a plurality of tunnel diode devices which are capable of being addressed by means of the matrix row and column input terminals. The writing operation is performed by providing a voltage across the desired memory device so as to temporarily shift the tunnel diode voltage-current characteristic curve to a writing position. A second voltage is applied simultaneously therewith. The level of this voltage is employed to control the binary state of the memory element being addressed. The second voltage is then removed and subsequent thereto the first voltage is removed thereby shifting the memory element characteristic curve back to its unaddressed position. In this condition the memory element will store the binary level imposed upon it indefinitely.

The read-out operation is performed by impressing a voltage upon the memory device of a value such that the memory element voltage-current characteristic curve is temporarily shifted to a read-out position. In this temporary position the state of the memory element is then compared against a reference level to determine the binary state of the memory element. The read-out voltage level is then removed causing the memory element to return to the nonaddress state while at the same time retaining the binary level imposed upon it during the writing operation. The memory element addressed during the reading operation does not change its state even after completion of the reading operation thereby preventing any alteration in the information stored therein. Such a change may occur only during the writing operation.

It is therefore one object of this invention to provide a random access memory employing tunnel diode elements which is so constructed as to perform reading and writing operations with substantially simplified control signals.

Another object of this invention is to provide a random access memory employing tunnel diode elements which is so constructed as to prevent alteration of the information states of each memory element during the reading operation.

Still another object of this invention is to provide a memory employing tunnel diode elements in which the information state of all memory elements of the system may be altered only during the writing operation thereof.

Still another object of this invention is to provide a memory employing tunnel diode elements which advantageously utilizes the presence of minority carriers in the diode elements thereof during the memory reading and writing operations.

These and other objects of this invention will become apparent when reading the accompanying description and drawings in which.

Figure 4:
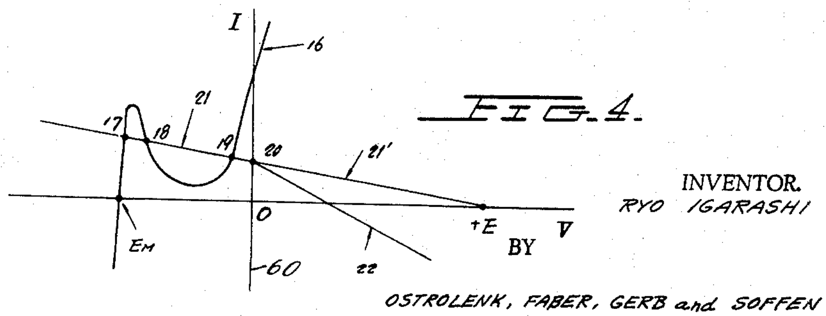
FIGURE 4 is a plot of the voltage-current characteristic curve of the tunnel diode elements employed in the instant invention which plot is utilized for the purposes of explaining the principles of the instant invention.
Figure 5A:
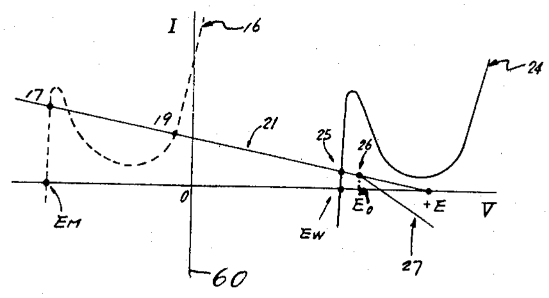

FIGURE 5*a* is a plot of the voltage-current characteristic curve of a tunnel diode similar to that shown in FIGURE 4 for the purpose of explaining the memory writing operation.

Figure 1:
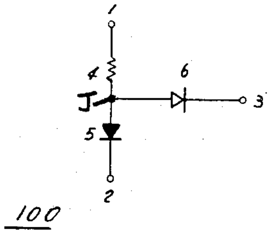
FIGURE 1 is a schematic diagram of the tunnel diode memory elements of the instant invention.
Figure 5B:
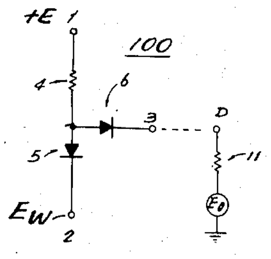

FIGURE 5*b* is a schematic diagram of the memory elements similar to FIGURE 1 as it appears during the writing operation.

Figure 6A:
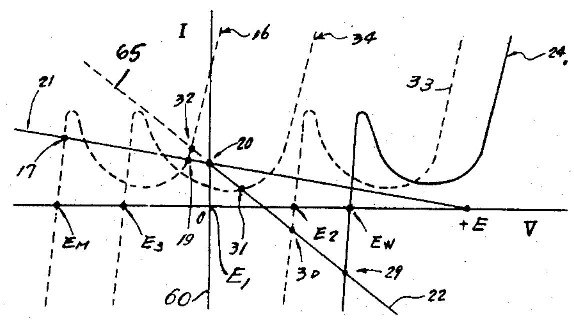

FIGURE 6*a* is another characteristic curve plot provided for the purpose of describing the writing operation.

Figure 6B:
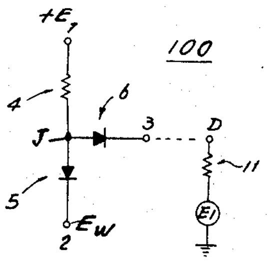

FIGURE 6*b* is a schematic diagram of a memory element similar to that shown in FIGURE 1 showing a second condition achieved by the memory element during the writing operation.

Figure 7:
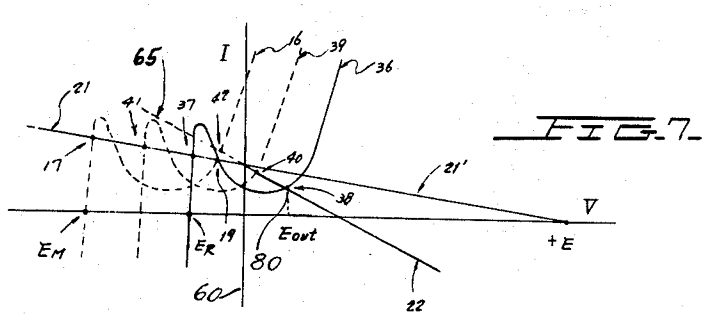

FIGURE 7 is another plot of a tunnel diode voltage-current characteristic curve which is provided for the purpose of describing the reading operation.

Figure 8:
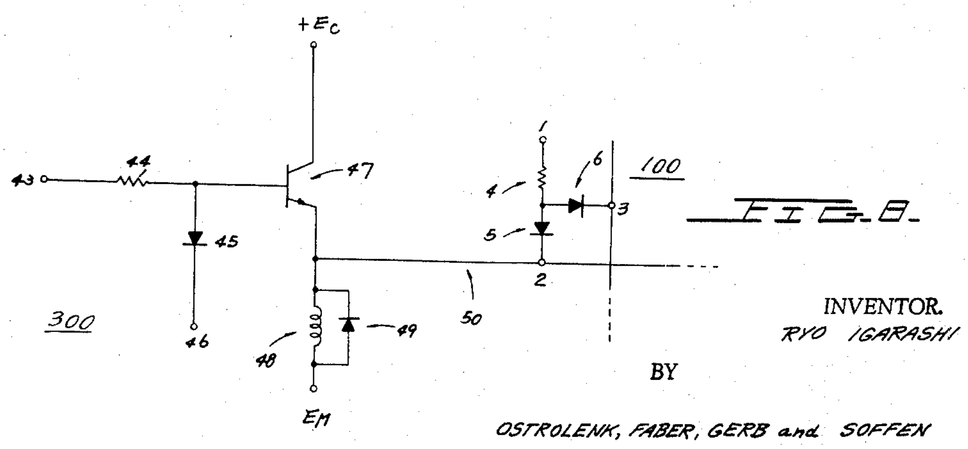

FIGURE 8 is a schematic diagram of one memory element similar to that shown in FIGURE 1 connected to an address driving circuit which is employed for both the read and write operations.

Prior-art operations and devices with which the present application is concerned, are described, for instance, in the prior-art publications listed below:

(1) "The Tunnel Diode as a Storage Element," J. C. Miller, K. Li, A. W. Lo; 1960 International Solid-State Circuits Conference Digest of Technical Papers. Louis Winner, New York 36, N.Y. (1960, 02, 11). Page 52–53.

(2) "A Tunnel Diode Tenth Microsecond Memory," M. M. Kaufman 1960; IRE International Convention Record 8 (pt. 2) p. 114–p.123. The Institute of Radio Engineering, Inc., 1 East 79 Street, New York 21, N.Y., March 21–24, 1960.

(3) "A Survey of Tunnel-Diode Digital Techniques," R. C. Sims, E. R. Beck and V. C. Kamm; Proceedings of the IRE January 1961, pages 136–146; The Institute of Radio Engineering, Inc., 1 East 79 Street, New York 21, N.Y.

(4) "A Fast-Word Organized Tunnel-Diode Memory Using Voltage-Mode Selection," G. B. B. Chaplin and P. M. Thompson; 1961 International Solid-State Circuits Conference Digest of Technical Papers. Louis Winner, New York 36, N.Y. (1961, 02, 15). Pages 40–41.

To simplify the description of the present invention, it is assumed that all operations and operating elements of such known systems are to be considered part of the present disclosure, except for the modifications and features of the present invention as hereinafter described.

Referring now to the drawings. FIGURE 1 shows a memory element 100 which forms the basis of this invention and which is comprised of a resistive element 4, tunnel diode 5 and ordinary diode 6. These elements are connected so as to form substantially a T-configuration wherein one terminal of the resistor 4 and the anode terminals of the tunnel and regular diode elements 5 and 6 respectively are connected together.

It is well known that in tunnel diodes of the type employed in FIGURE 1, two stable states may be obtained by impressing a suitable voltage across the tunnel diode terminals wherein the stable states are arrived at by super-imposing the voltage-current characteristics of the resistance 4 and the tunnel diode 5 such that the selected stable state is obtained by impressing across the terminals 1 and 2 of the memory element 100, the appropriate voltage derived by means of the intersection between the two voltage-current characteristic curves which are shown for example in FIGURE 4 and which will be more fully described.

Figure 2:
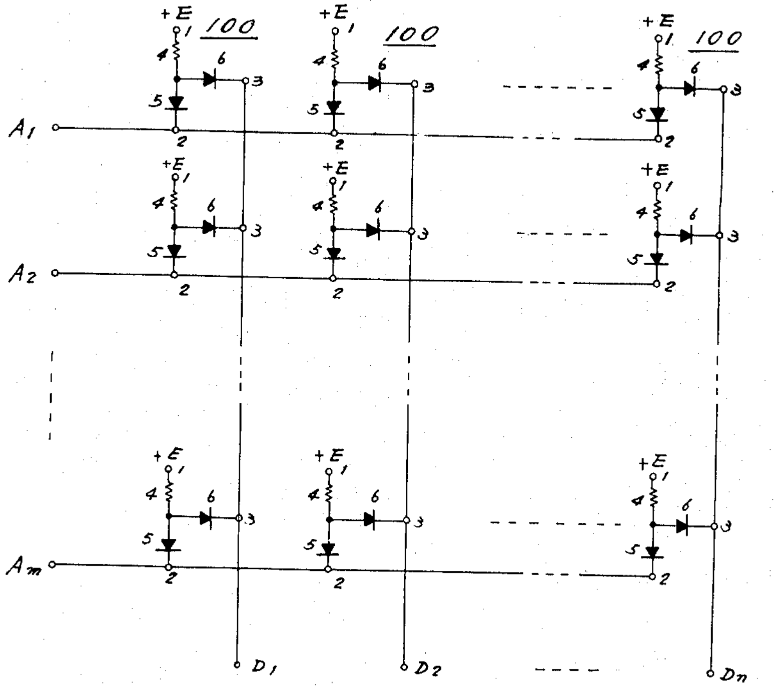
FIGURE 2 shows the tunnel diode elements of FIGURE 1 employed in a random access memory matrix.

FIGURE 2 shows a plurality of memory elements 100 similar to that shown in FIGURE 1 wherein the memory elements 100 are arranged in M rows and N columns. Each memory element terminal 1 is connected to a D.C. voltage source +E. The terminals 2 of each row are connected row by row to M address lines ($A_1$, $A_2$, . . ., $A_m$). The terminals 3 of the memory elements 100 of each column are connected column by column to N digit lines ($D_1$, $D_2$, . . ., $D_n$) respectively. The memory matrix during the unaddressed periods is in a state wherein a voltage level plus E is present at the terminals 1 and a voltage level plus $E_m$ is present at the terminals 2 (via the input terminals $A_1$–$A_m$). During a writing operation one selected line of the M address lines changes its voltage levels from $E_m$ to $E_w$ and during the reading operation one selected line of the M address lines changes its voltage levels from $E_m$ to $E_r$. The complete operations and the values of the voltage levels to be more fully described. $E_w$ is the voltage impressed on the address lines during the writing operation and $E_r$ is the voltage impressed on the address lines during the reading operations and will be called the reading and writing address voltages hereafter.

During the writing operation the address voltage $E_w$ is impressed upon the desired address line and at the same time a suitable voltage (to be more fully described), corresponding to the writing information is then impressed on each of the N digit lines. When performing a reading operation the memory information comprised of N memory elements which are connected to the selected address line appears on each of the digit lines $D_1$–$D_n$.

Figure 3:
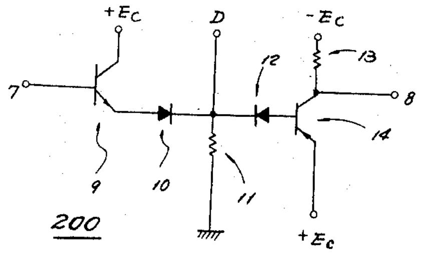
FIGURE 3 is a schematic diagram of a read-write amplifier which may be employed with the memory matrix of FIGURE 2.

FIGURE 3 illustrates a writing and reading amplifier 200 which may be employed with the matrix arrangement of FIGURE 2 such that the terminal D thereof of each such read-write amplifier is connected to one of the digit lines $D_1$–$D_n$ respectively. When writing, each amplifier provides the digit lines with the voltages corresponding to the above desired information states and when reading the amplifiers 200 amplify the information appearing on the associated digit line for subsequent utilization thereof.

When writing, a writing information signal is impressed from an outside source (not shown) upon the input terminal 7 wherein this voltage is impressed so as to cut off conduction in transistor 9 for writing in a binary zero information state and is of such a level as to provide conduction therethrough when writing in a binary one information state.

Transistor 14 of the read-write amplifier 200 is employed as the reading amplifier. During the read operation the voltage impressed upon the base 7 of the transistor 9 is such as to maintain the transistor 9 in the cut off condition so as to maintain the terminal D at zero potential although strictly speaking the base current of transistor 14 flows through the resistance 11 making the potential across the resistance 11*a* very slightly positive, which however, will not effect this invention materially.

The explanation of the circuit will be made hereafter assuming the potential of terminal D to be zero.

FIGURE 4 shows the relation of voltage and current of each memory element 100 as employed in the matrix of FIGURE 2 wherein the source voltage +E and the potential $E_m$ of the associated address line of the memory element are so chosen as is shown in FIGURE 4 so as to provide two stable states 17 and 19 which states are determined by the load line 21–21′ of the voltage-current characteristic curve 16 of the tunnel diode 5 of FIGURE 1. The above mentioned load line 21–21′ neglects the influence of diode 6 and the associated digit line but, when the potential at the junction J (see FIGURE 1) of tunnel diode 5 and resistance 4 exceeds the potential of the digit line which is zero voltage, the diode 6 becomes conductive and the load line 21–21′ becomes altered forming the composite load line 22 due to the resistance 4 and the resistance 11 which are in parallel connection thereby providing a resultant load line of the resistance 4 of diode 6 given by the broken line 21, 22. As stated previously, during a memorizing condition the address line potential $E_m$ and the source voltage +E are so chosen that either the tunnel diodes stable point 17 or 19 relative to the digit line potential which is at zero voltage level so as to cause diode 6 to be non-conductive. Assigning the stable points 17 and 19 which represent the intersections between the tunnel diode characteristic curve 16 and the load line 21 the binary values "0" and "1" respectively the operation of the memory element is as follows:

For the operation of writing into the memory element as was stated above previously, the desired address line, such as the address line $A_1$, for example, (see FIGURE 2) is selected and the potential of the said address line changes from the level $E_m$ to the level $E_w$ as shown in FIGURE 5*a*. At this juncture it should be noted that in considering the plots of FIGURES 4, 5*a*, 6*a* and 7 that the zero voltage level is represented by the Y or vertical axis designated by numeral 60 in each of the aforementioned figures. Thus in considering FIGURE 4, it should be noted that the voltage level +E being more positive than a zero voltage is plotted and appears as a point to the right of the zero voltage axis 60, while the voltage level $E_m$ which represents the non-addressed voltage state of a memory element since it lies to the left of the zero voltage level axis 60, it is therefore a negative voltage level relative to the zero voltage level.

Thus, during the writing operation the voltage level at the terminal 2 of the memory element selected to be written into changes from a value $E_m$ to a value $E_w$. As shown in FIGURE 5*a* this results in a shifting to the right of the tunnel diode characteristic curve such that the curve shifts from its initial position designated by numeral 16 to the position of the curve 24. Since the voltage +E impressed upon the terminal 1 of the memory element 100 remains unchanged, the load line 21 likewise remains unchanged.

In order that a binary zero information state be written into the memory element 100 it is necessary that a voltage be impressed upon terminal 3 of the memory element 100 of a voltage level equal to or greater than the voltage level $E_w$ so as not to move from the load line 21 to the composite load line 27. That is if the voltage at the terminal 3 of the memory element 100 is equal to or greater than the voltage level at the terminal 2 then no conductive path exists through resistance 11 such that resistance 11 and resistance 4 are not in electrical parallel at this time and the load line for the condition at this instant of time remains the load line 21. Thus the memory element 100 with the appropriate voltages at this given instant of time as shown in FIGURE 5*b* wherein +E volts is impressed upon terminal 1, $E_w$ volts is impressed upon terminal 2 and $E_0$ volts is impressed upon terminal 3 thereof. This condition is obtained by impressing a positive voltage level upon the base terminal 7 of transistor 9 of FIGURE 3, causing terminal D thereof to rise to the level of $E_0$ volts. Terminal D being positive, the diode 12 blocks any signal from being impressed upon, the base terminal of transistor 14 thereby preventing a premature read out operation.

The voltage level $E_w$ is then removed from terminal 2 of the memory element 100 returning terminal 2 to the voltage level of $E_m$ shown in FIGURE 5*a*. This causes the voltage current characteristic curve of the tunnel diode to shift from the position held by curve 24 to the left returning to the position shown by curve 16. The conductive state of the tunnel diode, which is at point 26 on load line 21 due to the fact that voltage $E_0$ is slightly larger than voltage $E_w$ moves in the following manner, 26–25–17 so that the final current condition of the memory element 100 is at point 17 representing a binary zero information state condition being stored by the tunnel diode 5. Since in this non-address state voltages +E and $E_m$ are maintained at a constant value the memory element 100 will be maintained in this state indefinitely.

In order to write a binary one information state into the memory element 100 it is again necessary to impress a voltage level $E_w$ upon terminal 2 of memory element 100 (see FIGURE 6*b*). However, in order to obtain the binary one information state in this element a voltage $E_1$ must be developed at terminal D (i.e., at terminal 3) of memory element 100. This is done by providing a voltage at base terminal 7 at amplifier 200 (see FIGURE 3) which cuts off conduction in transistor 9 thereby placing terminal D of amplifier 200 and hence terminal 3 of binary element 100 at the zero voltage level represented by the symbol $E_1$ shown in FIGURES 6*a* and 6*b*. In this state since the voltage $E_w$ is greater than the voltage $E_1$ (i.e., zero reference voltage) diode 6 of memory element 100 becomes conductive thereby placing resistors 4 and 11 in electrical parallel causing a new load line 22 to be generated such that with the voltage $E_w$ impressed upon terminal 2 of memory element 100 the intersection between curve 24 and load line 22 occurs at the point 29.

The voltage $E_w$ is then removed from terminal 2 so as to return terminal 2 to the voltage level represented by $E_m$. In shifting from the position occupied by curve 24 to the initial starting position, i.e., the position occupied by curve 16, the intersection between the tunnel diode voltage-current characteristic curve and the load curve follows the load line 22. Load line 22 is followed beyond the point 20 shown in FIGURE 6*a* as shown by the dotted straight line 65 which extension or extrapolation is produced by the presence of minority carriers stored in diode 6 at a time previous to the completion of the movement of the voltage-current characteristic from the position of curve 24 to the position of curve 16. During the presence of these minority carriers and when the temporary load curve 22 is being traversed due to the process in which the address line voltage potential returns from the level $E_w$ to $E_m$ the tunnel diode voltage-current characteristic curve moves from right to left such that the curve assumes the positions as shown by curves 24, 33, 34 and ultimately curve 16. At this time the intersecting point movement is shown by the points 29, 30, 31 and ultimately point 32.

When the tunnel diode voltage-current characteristic curve is at the position shown by the curve designated number 34 its intersection exceeds the peak current of the tunnel diode causing the intersection to occur at point 31 which is a stabilized region of the curve 34 and which is further in the immediate region of the point on the curve which represents the binary one information state. The curve then shifts to the position shown by curve 16 such that the final intersection point is point 32. After a predetermined time period the minority carriers present in diode 6 disappear causing an immediate return from the load line 22 to the load line 21 causing the intersection to become stabilized at point 19 from point 32 thereby completing the operation of writing or storing a binery one information state into the memory element 100. As one example of the type of diode which may be used for the diode 6 in the memory element 100 a point contact type diode may be employed thus enabling the period during which the minority carriers exist to be substantially shortened at the same time by shortening the disappearance time of minority carriers so as to return the memory element to the unaddressed memory state. This shortens the time period upon which the writing potential is impressed upon the elected address line so as to achieve high speed operation thereof.

To describe the operation of reading as stated briefly above the address line chosen such as for example the address line $A_1$ shown in FIGURE 2 has a voltage $E_r$ impressed upon it. This voltage level is shown relative to the other voltage levels employed in the circuit most clearly upon consideration of FIGURE 7 and it can be seen that the voltage level $E_r$ is less positive than the zero reference level represented by the vertical line 60. The shift in voltage at terminal 2 of the memory element 100 form $E_m$ to $E_r$ results in a shafting of the voltage-current characteristic curve of the N memory elements connected to the selected address line so that the characteristic curve attains the position occupied by the curve 36 of FIGURE 7.

As was previously described, during the read-out operation a negative voltage is impressed upon the terminal 7 of transistor 9 thereby maintaining transistor 9 in the cut off condition so that the potential at this instant of time at terminal D is at the zero voltage level.

Assuming now that a binary zero information state is being read out from a memory element 100 then the initial current condition of the memory element being read is represented by the point 17 shown in FIGURE 7. Movement of the curve towards the right from the position 16 to the position 36 causes the point 17 to move to the position shown by the point 37 thus a voltage level exists at junction J (see FIGURE 1) which is more negative than the level at terminal D and hence terminal 3 of the memory element 100 causing diode 6 to be reverse biased thereby preventing conduction therethrough. Thus the absence of a voltage drop developed across resistance 11 is recognized during the read-out operation as the binary zero information state for the particular memory element which has been addressed.

The read-out operation is then completed by removing the read-out voltage $E_r$ from terminal 2 of the memory element 100 causing the voltage level at terminal 2 to return to the value $E_m$ as shown in FIGURE 7. This causes the characteristic curve to shift from position 36 to position 39 and ultimately to position 16 causing the stable point 37 to move through point 41 and return to its initial stable position shown by the point 17 of FIGURE 7.

In the read-out operation wherein the memory element being addressed contains a binary one information bit, i.e., where the memory element is in the state representing a binary one information state, the stable point is the point 19 which identifies the intersection between load line 21 and curve 16 as shown in FIGURE 7. The read-out voltage $E_r$ is then imposed upon terminal 2 of the memory element 100 shifting the characteristic curve from the position of curve 16 to the position of curve 36. In this case the stable point 19 moves along load line 21–21′ until it hits the zero reference level axis 60. As the point 19 moves to the right of axis 60, diode 6 of the memory element 100 becomes conductive thereby generating composite load line 22. Thus point 19 moves first to the position 40 and ultimately to the position 38. At this point an output voltage 80 is developed across resistance 11. Thus during the read-out operation the development of a voltage across the resistance 11 is identified as the representation of a binary information state contained in the memory element 100 being addressed.

The reading operation is completed by removing the voltage $E_r$ from the terminal 2 of the memory element 100 causing the characteristic curve to move from the position shown by curve 36 to the position shown by curve 39 and ultimately to the initial starting position shown by curve 16 of FIGURE 7. This causes the intersecting point to move from the position 38 to the position 40 and then to the position 42. The composite load line 22 is extrapolated as shown by straight dotted line 65 to the left of the zero voltage reference axis 60 in order to explain the function performed by the minority carriers as was previously described. Thus the minority carriers stored in the diode 6 during conduction thereof require a predetermined time after return of terminal J memory element 100 through the zero voltage level thereby permitting conduction to be maintained through diode 6 for a predetermined time thereafter thereby explaining the reason for the movement of point 38 through point 40 to the point 42. As the minority carriers disappear point 42 travels along characteristic curve 16 through the point 19 which represents the intersection between load line 21–21′ and characteristic curve 16 which is the case when diode 6 is no longer conducting and further when the minority carriers in diode 6 have completely disappeared. Thus it can be seen that in the read-out operation regardless of whether the tunnel diode memory element 100 is in the binary zero or the binary one information state the read-out operation has no effect whatsoever upon this state permitting the memory element 100 to return to the state in which it was immediately prior to initiation of the read-out operation. This construction thereby assures a safe read-out operation with no danger whatsoever to altering the memory states of the memory elements contained in the matrix.

Furthermore the following conditions are necessary in order to provide successful operation of the memory elements 100. The memory state of the memory elements 100 connected to an address line other than the memory element being selected must not change their state due to the change in voltage potential of the selected address line or due to the potential impressed upon the digit lines $D_1$–$D_n$ which are employed during the writing operation. Since the potential of the address line and the digit line of the selected memory device in the writing operation is forced higher than that of the memory state the potential change of a memory element other than that selected through the desired digit line is prevented by means of the diode 6 in each memory element from undergoing any change and no memory element other than the selected element will be subjected to any change whatsoever.

FIGURE 8 shows an example of an addressing circuit 300 employed for controlling the memory state and the writing potential impressed upon the appropriate address line wherein the circuit 300 is shown in combination with one typical memory element 100. It should be understood that the addressing circuit 300 of FIGURE 8 is connected to each of the M address lines which is represented equivalently by the number 50 in FIGURE 8. As explained in FIGURES 5–7 the address line potential is changed from $E_m$ to $E_w$ during the write-in operation and is subsequently returned from the voltage level $E_w$ to the voltage level $E_m$ whereas during the reading operation the address line potential is changed from $E_m$ to $E_r$ and subsequently thereto from $E_r$ to $E_m$. The addressing circuit 300 performs these functions in the following manner:

During periods when the address line, such as for example the address line 50, is not being addressed, the address line potential is kept at voltage level $E_m$ through inductance 48 which is connected between the voltage level $E_m$ and the address line 50. During a writing operation a voltage is impressed on the terminal 46 the function of which will be more fully described. A positive pulse is then impressed upon the terminal 43 of addressing circuit 300. As a result of these two voltages the diode 45 of addressing circuit 300 causes a clamped positive pulse to be impressed upon the base electrode of transistor 47. The value of the positive pulse is determined solely by the voltage impressed on the terminal 46 whose potential is so chosen as to make the potential of the address line 50 equal to the voltage level $E_w$.

During the reading operation a positive pulse whose amplitude is the same as that employed in the writing operation is impressed upon the input terminal 43 of addressing amplifier 300. In this case the potential impressed upon the terminal 46 is of a voltage level that will make the address line potential 50 equal to $E_r$. This voltage level is impressed upon address line 50 by virtue of the fact that the current flow through transistor 47 causes a voltage drop to be generated across inductor 48 thereby providing the necessary voltage level $E_r$ to $E_w$ to address line 50. The diode 49 functions to remove the counter E.M.F. generated in the inductance 48 after completion of the writing or reading operations so as to immediately return the address line potential to the voltage level $E_m$.

To supplement the merits of this memory device further, since the memory device is operated by a simple control signal the circuit construction is simplified and since the minority carriers storing effect which is apt to create problems in a high speed operation is in the present invention utilized in a positive manner, a stable writing operation is thereby possible even at extreme high speed operation.

Although this invention has been explained by reference to a preferred embodiment described here and above, this description should not be construed to limit the scope of the invention. For example, a concept of this invention can be employed in the following alternative manner: By reversing the connection of the memory element tunnel diode and the regular diodes 5 and 6 respectively and by reversing the polarities of the voltages and the pulses impressed in every other position of the matrix, a memory device can be constructed so as to operate in a manner similar to the memory devices described previously.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Data storage means comprising a matrix of a plurality of storage means being arranged in a two dimensional array of rows and columns; each of said storage means comprising first and second diode means each having first and second terminals; impedance means, the first terminals of each of said diode means being connected to one terminal of said impedance means, said second diode means being a tunnel diode; said first terminals of said first diode means and said tunnel diode being the anode terminal; means connected to first diode means second terminal for changing the load impedance of said tunnel diode means under predetermined input conditions to change the operating state of said tunnel diode means; each of said rows and columns including a conductor; each of said row conductors being connected to the second terminal of said first diode means of each storage means associated with that row; each of said column conductors being connected to the second terminal of said second diode means; a constant voltage source connected to the second terminal of each of said impedance means, first signal generating means connected to each of said row conductors; second signal generating means connected to each of said column conductors; said first signal generating means including means for generating first electrical signal representing the information state to be stored by the storage means of the associated row; said second signal generating means including means for generating a second electrical signal simultaneously with said first electrical signal for causing the storage means of the associated column to assume the information state represented by said first electrical signal, each of said first signal generating means including second means for sensing the information state of said storage means said second means including means for inhibiting the first electrical signal, each of said second signal generating means including second means for generating a third electrical signal enabling said first signal generating means to sense the state of said storage means.

2. Data storage means comprising a matrix of a plurality of storage means being arranged in a two dimensional array of rows and columns; each of said storage means comprising first and second diode means each having first and second terminals; impedance means, the first terminals of each of said diode means being connected to one terminal of said impedance means, said second diode means being a tunnel diode; said first terminals of said first diode means and said tunnel diode being the anode terminal; means connected to first diode means second terminal for changing the load impedance of said tunnel diode means under predetermined input conditions to change the operating state of said tunnel diode means; each of said rows and columns including a conductor; each of said row conductors being connected to the second terminal of said first diode means of each storage means associated with that row; each of said column conductors being connected to the second terminal of said second diode means; a constant voltage source connected to the second terminal of each of said impedance means; first signal generating means connected to each of said row conductors; second signal generating means connected to each of said column conductors; said first signal generating means including means for generating first electrical signal representing the information state to be stored by the storage means of the associated row; said second signal generating means including means for generating a second electrical signal simultaneously with said first electrical signal for causing the storage means of the associated column to assume the information state represented by said first electrical signal, each of said first signal generating means including second means for sensing the information state of said storage means said second means including means for inhibiting the first electrical signal, each of said second signal generating means including second means for generating a third electrical signal enabling said first signal generating means to sense the state of said storage means, each of said storage means being adapted to prevent a change in its information state during a sensing operation.

3. Data storage means comprising a matrix of a plurality of storage means being arranged in a two dimensional array of rows and columns; each of said storage means comprising first and second diode means each having first and second terminals; impedance means, the first terminals of each of said diode means being connected to one terminal of said impedance means, said second diode means being a tunnel diode; said first terminals of said first diode means and said tunnel diode being the anode terminal; means connected to first diode means second terminal for changing the load impedance of said tunnel diode means under predetermined input conditions to change the operating state of said tunnel diode means; each of said rows and columns including a conductor; each of said row conductors being connected to the second terminal of said first diode means of each storage means associated with that row; each of said column conductors being connected to the second terminal of said second diode means; a constant voltage source connected to the second terminal of each of said impedance means, first signal generating means connected to each of said row conductors; second signal generating means connected to each of said column conductors; said first signal generating means including means for generating first electrical signal representing the information state to be stored by the storage means of the associated row; said second signal generating means including means for generating a second electrical signal simultaneously with said first electrical signal for causing the storage means of the associated column to assume the information state represented by said first electrical signal, each of said first signal generating means including second means for sensing the information state of said storage means said second means including means for inhibiting the first electrical signal, each of said second signal generating means including second means for generating a third electrical signal enabling said first signal generating means to sense the state of said storage means, each of said storage means being adapted to prevent a change in its information state during a sensing operation, and being further adapted to permit a change in its information state during a storing operation regardless of the previous memory state of said storage means.

4. Information storage means capable of storing an information state for an indefinite time comprising first and second diode means each having first and second terminals; impedance means, the first terminals of each of said diode means being connected to one terminal of said impedance means, said second diode means being a tunnel diode; a constant voltage source connected to the second terminal of said impedance means opposite said impedance means first terminal; first signal generating means connected to the second terminal of said first diode means, second signal generating means connected to the second terminal of said second diode means; said first signal generating means including means for generating first electrical signal representing the information state to be stored by said storage means; said second signal generating means including means for generating a second electrical signal simultaneously with said first electrical signal for causing said storage means to assume the information state represented by said first electrical signal, said first signal generating means including second means for sensing the information state of said storage means said second means including means for inhibiting the first electrical signal; said second signal generating means including second means for generating a third electrical signal enabling said first signal generating means to sense the state of said storage means.

5. Information storage means capable of storing an information state for an indefinite time comprising first and second diode means each having first and second terminals; impedance means, the first terminals of each of said diode means being connected to one terminal of said impedance means, said second diode means being a tunnel diode; a constant voltage source connected to the second terminal of said impedance means opposite said impedance means first terminal; first signal generating means connected to the second terminal of said first diode means, second signal generating means connected to the second terminal of said second diode means; said first signal generating means including means for generating first electrical signal representing the information state to be stored by said storage means; said second signal generating means including means for generating a second electrical signal simultaneously with said first electrical signal for causing said storage means to assume the information state represented by said first electrical signal, said first signal generating means including second means for sensing the information state of said storage means said second means including means for inhibiting the first electrical signal; said second signal generating means including second means for generating a third electrical signal enabling said first signal generating means to sense the state of said storage means; said storage means being adapted to prevent a change in its information state during a sensing operation.

6. Information storage means capable of storing an information state for an indefinite time comprising first and second diode means each having first and second terminals; impedance means, the first terminals of each of said diode means being connected to one terminal of said impedance means, said second diode means being a tunnel diode; a constant voltage source connected to the second terminal of said impedance means opposite said impedance means first terminal; first signal generating means connected to the second terminal of said first diode means, second signal generating means connected to the second terminal of said second diode means; said first signal generating means including means for generating first electrical signal representing the information state to be stored by said storage means; said second signal generating means including means for generating a second electrical signal simultaneously with said first electrical signal for causing said storage means to assume the information state represented by said first electrical signal, said first signal generating means including second means for sensing the information state of said storage means said second means including means for inhibiting the first electrical signal; said second signal generating means including second means for generating a third electrical signal enabling said first signal generating means to sense the state of said storage means; said storage means being adapted to prevent a change in its information state during a sensing operation, and being further adapted to permit a change in its information state during a storing operation regardless of the previous memory state of said storage means.

References Cited by the Examiner

UNITED STATES PATENTS

| | | | |
|---|---|---|---|
| 3,050,637 | 8/62 | Kaufman | 340—173 |
| 3,089,126 | 5/63 | Miller | 340—173 |
| 3,107,345 | 10/63 | Gruodis | 340—173 |
| 3,119,985 | 1/64 | Kaufman | 340—173 |

OTHER REFERENCES

"A Fast-Word Organized Tunnel-Diode Memory Using Voltage-Mode Selection," by G. B. B. Choplin et al. 1961 International Solid-State Circuits Conference Digest of Technical Papers (TK–7872–T73T65), Feb. 15, 1961, pp. 40–41.

"A Survey of Tunnel-Diode Digital Techniques," by R. C. Sims et al. Proceedings of the IRE, Jan. 1961, pp. 136–146.

IRVING L. SRAGOW, *Primary Examiner.*

BERNARD KONICK, *Examiner.*